(12) United States Patent
Stefani et al.

(10) Patent No.: US 7,398,057 B2
(45) Date of Patent: Jul. 8, 2008

(54) SECURITY MESSENGER SYSTEM

(75) Inventors: Rolf Stefani, West River, MD (US); Sean Reilly, Stevensville, MD (US)

(73) Assignee: ARINC Inc., Annapolis, MD (US)

( * ) Notice: Subject to any disclaimer, the term of this patent is extended or adjusted under 35 U.S.C. 154(b) by 190 days.

(21) Appl. No.: 10/642,627

(22) Filed: Aug. 19, 2003

(65) Prior Publication Data

US 2004/0162067 A1    Aug. 19, 2004

Related U.S. Application Data

(60) Provisional application No. 60/404,388, filed on Aug. 20, 2002.

(51) Int. Cl.
*H04Q 7/20* (2006.01)

(52) U.S. Cl. .............. 455/68; 709/230; 709/246; 340/961; 348/143; 701/35; 725/105; 455/456.1; 455/456.2; 455/456.6; 455/456.4; 455/431

(58) Field of Classification Search ............. 455/431, 455/552.1, 452.1, 435, 456.1, 456.2, 456.6, 455/456.4, 68; 348/143; 709/230, 246; 340/961; 725/105; 701/11
See application file for complete search history.

(56) References Cited

U.S. PATENT DOCUMENTS

| | | | |
|---|---|---|---|
| 5,742,336 A * | 4/1998 | Lee | ............................. 348/144 |
| 5,761,625 A | 6/1998 | Honcik et al. | |
| 5,798,458 A | 8/1998 | Monroe | |
| 5,809,402 A | 9/1998 | Lemme | |
| 5,828,373 A | 10/1998 | Yves | |
| 5,920,807 A | 7/1999 | Lemme | |
| 6,009,356 A | 12/1999 | Monroe | |
| 6,023,239 A | 2/2000 | Kovach | |
| 6,173,230 B1 | 1/2001 | Camus et al. | |
| 6,246,320 B1 | 6/2001 | Monroe | |
| 6,275,767 B1 | 8/2001 | Delseny et al. | |
| 6,308,044 B1 | 10/2001 | Wright et al. | |
| 6,353,779 B1 | 3/2002 | Simon et al. | |
| 6,366,311 B1 | 4/2002 | Monroe | |
| 6,384,778 B1 | 5/2002 | Campbell | |
| 6,384,783 B1 | 5/2002 | Smith et al. | |
| 6,385,513 B1 | 5/2002 | Murray et al. | |
| 6,393,297 B1 * | 5/2002 | Song | ........................... 455/466 |
| 6,400,945 B1 | 6/2002 | Jensen et al. | |
| 6,657,578 B2 * | 12/2003 | Stayton et al. | ................. 342/30 |

(Continued)

FOREIGN PATENT DOCUMENTS

GB    2 320 992 A    7/1998

(Continued)

*Primary Examiner*—Dwayne Bost
*Assistant Examiner*—Pierre-Louis Desir
(74) *Attorney, Agent, or Firm*—Oliff & Berridge, PLC

(57) ABSTRACT

The invention provides a communication and control system and method including a portable control and display unit, such as a portable handheld pocket PC, an aircraft mounted integrated Global Positioning System (GPS) satellite receiver, a VHF radio modem, an Aircraft Communication and Reporting System (ACARS) transceiver, a backup battery for power, and a camera aboard the aircraft which is controlled by the portable control and display unit. The control and display unit transmits and receives data messages, voice communication and video communication, and control the operation and functions of the camera while in flight or on the ground. The control and display unit also communicates as a cell phone.

2 Claims, 6 Drawing Sheets

U.S. PATENT DOCUMENTS

| | | | |
|---|---|---|---|
| 2002/0004411 A1* | 1/2002 | Heppe et al. | 455/552 |
| 2003/0003872 A1* | 1/2003 | Brinkley et al. | 455/66 |
| 2003/0041155 A1* | 2/2003 | Nelson et al. | 709/230 |
| 2003/0062447 A1 | 4/2003 | Cordina et al. | |
| 2003/0065428 A1* | 4/2003 | Mendelson et al. | 701/9 |
| 2003/0093798 A1 | 5/2003 | Rogerson | |
| 2003/0094541 A1 | 5/2003 | Zeineh | |
| 2003/0109973 A1* | 6/2003 | Hensey et al. | 701/35 |
| 2004/0008253 A1* | 1/2004 | Monroe | 348/143 |
| 2006/0167598 A1* | 7/2006 | Pennarola | 701/11 |

FOREIGN PATENT DOCUMENTS

| | | |
|---|---|---|
| GB | 2 347 586 A | 9/2000 |
| GB | 2 350 972 A | 12/2000 |
| WO | WO 01/03437 A1 | 1/2001 |

* cited by examiner

SECURITY MESSENGER SYSTEM

This application claims the benefit of U.S. Provisional Application No. 60/404,388, filed Aug. 20, 2002, the disclosure of which is incorporated herein by reference.

BACKGROUND OF THE INVENTION

1. Field of Invention

This invention relates generally to secure mobile data, video and voice communications. More specifically, this invention relates to intra-vehicle as well as inter-vehicle communications and communications with a designated operations center.

2. Description of Related Art

Air security has been a major concern in recent times. For many years, the Federal Aviation Administration (FAA) has implemented the Federal Air Marshal (FAM) program that places air marshals on U.S. air carriers. The FAM program serves as a deterrent to hijacking and other forms of terrorist activity aboard aircraft. The program provides a covert, armed security force capable of conducting anti-hijacking operations and of deploying rapidly. FAMs are specially trained Special Agents who travel on U.S. air carriers on routes and in areas where worldwide terrorist activities might occur. FAMs are authorized to carry firearms and, if they reasonably believe that a person has committed, or is committing, a felony, are authorized to make arrests without an arrest warrant for any offense against the U.S. However, once in flight, the FAMs have no communication capability. Accordingly, FAMs need a non-obtrusive communication device that has a clear channel communication with an operations center, which may be on the ground or airborne. The communication device should allow text messages, discernable graphics and voice transmissions. The device should be able to transmit an image to, and receive an image from, an operations center. The device should also have the ability to control remote mounted surveillance cameras, view a camera image and send the image to an operations center. In an extremis situation, the device should activate a tracking device that can only be turned off by, for example, an encrypted message from a geographically different source. The device should allow global communications.

SUMMARY OF THE INVENTION

The object of this invention is to provide a communication system that integrates all the required applications of data, video and voice communications into a single device and then facilitates transmitting the data/graphics/voice portion over an existing data network when appropriate.

The communication system, according to the invention provides a control and display unit, such as a portable handheld pocket PC or Personal Digital Assistant (PDA), an aircraft mounted integrated Global Positioning System (GPS) satellite receiver, aVHF radio modem and/or Iridium satellite modem, an Aircraft Communication and Reporting System (ACARS) transceiver and a backup battery for power.

This invention provides systems and methods for sending data messages from an aircraft when in flight or on the ground.

This invention separately provides systems and methods for sending voice communications from an aircraft when in flight or on the ground.

This invention separately provides systems and methods for displaying, transmitting and/or receiving real time video or still graphics when in flight or on the ground.

This invention separately provides systems and methods for communicating in a cellular telephone mode when on the ground.

In various exemplary embodiments of the systems and methods according to this invention, data can be transmitted as messages. For example, data messages can be communicated to other Federal Air Marshals (FAMs) on board a flight, to ground based terminals, such as a ground operations center, to other FAMs on other flights, to iDEN handhelds on airport surface, and/or to the pilot on board, via the ACARS terminal.

In various exemplary embodiments of the systems and methods according to this invention, data link can be transmitted in a form of a custom message set that is encrypted.

In various exemplary embodiments of the systems and methods according to this invention, voice communications can be sent to other FAMs on board the flight. In additional embodiments, voice communications may be directed to a land-based phone line, to iDEN handhelds, to the pilot of the aircraft, to the pilot of another aircraft, and/or to other FAMs on other flights.

In various exemplary embodiments of the systems and methods according to this invention, a video mode can be used to display, transmit and/or receive video signals. For example, the video mode can display streaming video, interface to an onboard camera system and select video frames to data link to the ground operations center.

In various exemplary embodiments of the systems and methods according to this invention, a cellular telephone mode can use cellular telephone technology when not airborne. As an exemplary embodiment, the usable cellular telephone technology may be Global System for Mobile communications (GSM) or General Packet Radio Service (GPRS) technologies to allow users to access the Internet, send and receive e-mails and Short Message Services (SMS) messages, and communicate using the inherent voice capabilities of the cellular telephone technology, such as, but not limited to CDMA, FDMA, TDMA and PSTN.

In a further various exemplary embodiments of the systems and methods according to this invention, the video mode can interface to and control onboard peripheral devices, such as, for example, cameras in the cockpit and/or cabin of the aircraft.

In a further various exemplary embodiments of the systems and methods according to this invention, the flight crew may activate a device, such as, for example, a "panic button," in the cockpit to transmit a signal that there is a threatening situation or condition to the ground operations center and/or FAMs. Another exemplary embodiment according to this invention includes a portable remote panic button. The remote panic button also transmits a signal to the ground operations center and/or FAMs.

In various exemplary embodiments of the systems and methods according to this invention, an Emergency Broadcast Message capability is provided.

In various exemplary embodiments of the systems and methods according to this invention, a low cost intrusion security system is provided because the system is already integrated over an existing infrastructure and set of commercial products for communications, distribution and situational awareness, such as the Aircraft Communications Addressing and Reporting System (ACARS) data network. In yet another exemplary embodiment, the system may be integrated with a SATCOM capability.

In various exemplary embodiments of the systems and methods according to this invention, administrative functions to back office applications are provided, such as for scheduling, gate assignments, cabin inventory, cargo inventory, reservations and to access a passenger database.

In various exemplary embodiments of the systems and methods according to this invention, input sensors can interface with and monitor onboard devices, such as, for example, physical panic buttons that can be used by the flight crew to alert FAMs of threat conditions.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods according to this invention will be described in detail, with reference to the following figures, wherein.

DETAILED DESCRIPTION OF EXEMPLARY EMBODIMENTS

Figure 1:
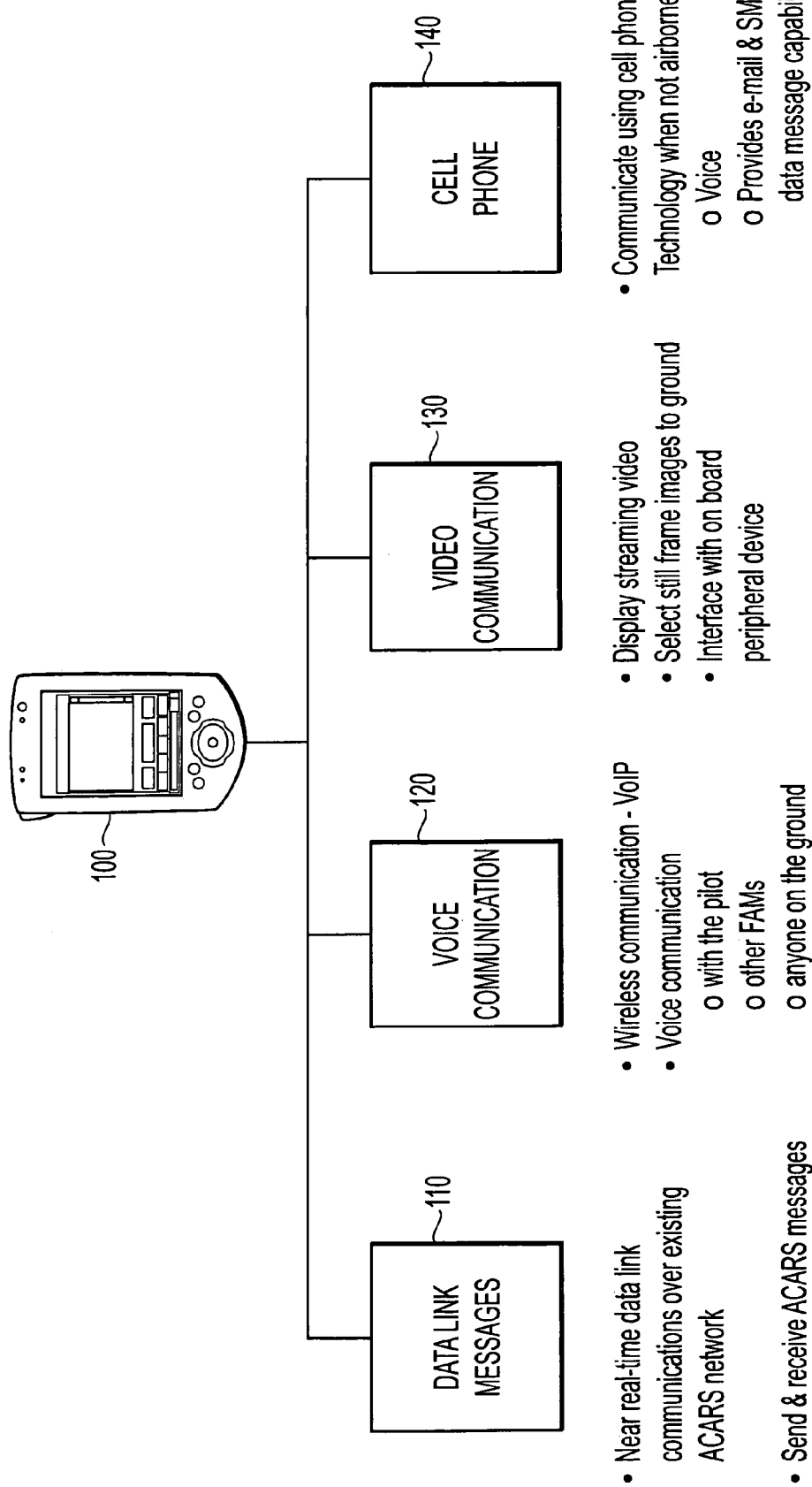
FIG. 1 illustrates various communication functions of one exemplary embodiment of a communication system according to this invention.

FIG. 1 illustrates various communication functions of one exemplary embodiment of a communication system according to this invention. The communication system provides a control and display unit (CDU) 100, employing a wireless communication capability such as a Secure 802.11 or Bluetooth, that integrates all the required application modes of data link messages 110, voice communication 120, video communication 130 and cellular telephone ("cell phone") 140 into a single device.

In exemplary embodiments of the systems and methods according to this invention, data can be transmitted as data link messages while an aircraft is in flight. The data link messages 110 can be communicated to other Federal Air Marshals (FAMs) on board the aircraft, to ground based terminals, such as ground operations center, to other FAMs on other flights, to iDEN handhelds on airport surface, and/or to the pilot on board the aircraft.

Moreover, the data link messages can be in a form of a custom message set that is encrypted.

The data communication 110 is transmitted over a near real-time data link communications over an existing network, such as the Aircraft Communications Addressing and Reporting System (ACARS) from ARINC, Incorporated. ACARS is used in airline operational control and, increasingly, air traffic control communications around the world. ACARS uses various data link technologies including the VHF communication band, HF and SATCOM, along with a ground station network, to allow the aircraft to transmit and receive the data messages. Many domestic and international carriers have equipped their aircraft with the ACARS system, thus, implementing the present system over the ACARS system will be cost effective and should prove highly reliable. The ACARS system also provides high reliability and message delivery assurance as well as 24/7/365 real time monitoring of the system.

In exemplary embodiments of the systems and methods according to this invention, the voice communication 120 mode can be transmitted to other FAMs on board the flight. Further, the voice communication mode may be connected to a land-based phone line, to iDEN handhelds, to the pilot of the aircraft, to the pilot of another aircraft, and/or to other FAMs on other flights.

Further, the voice communication 120 mode may also perform as a two-way voice communication apparatus accomplished over an existing ARINC Air/Ground Domestic (AGD) network using VHF voice radio capability. The ARINC operated AGD network is an Aviation communications service that is provided to aircraft flying over North America. The ARINC AGD network includes over 110 ground based VHF and HF transceiver sites which are monitored by ARINC radio operators constantly. The AGD network radio operators act as intermediaries to connect airborne aircraft to any facility that they need to contact on the ground. Conversely, radio operators can also connect ground based calling parties to aircraft while airborne. Also, by utilizing automation technology in the ARINC ground based control system, airborne aircraft can directly connect to ground based circuits without radio operator intervention should the airborne equipment be capable of tone generation. FAMs can use this voice network to establish direct voice communications with any ground based telephone network including the control or operations center.

Further, the voice communication 120 mode may also perform as a wireless communication voice-over Internet Protocol (VoIP) technology. In VoIP applications, voice signals are digitized and packetized at a sending end, transmitted via the Internet in a digital format to a receiving end where they are converted into analog voice signals.

In another exemplary embodiments of the systems and methods according to this invention, the video communication 130 mode can be used to display, transmit and/or receive a video signal. For example, the video mode can display streaming video, select video frames to data link to the ground operations center and interface to a multiple onboard camera system. The multiple onboard cameras can transmit real time video to the CDU 100 as streaming video images and/or still video images wirelessly, whereby the FAMs may transmit video signals to the ground operations center. Further, the FAMs can remotely control and/or interface with the cameras and affect the movements and functions of the cameras.

In another exemplary embodiment of the systems and methods according to this invention, the video communication 130 mode can perform a tracking display function in real time. For example, the FAMs have the capability to receive ACARS messages on a device which include position report messages that can display a geographical representation or map of the location of the aircraft. This capability provides the FAMs a mechanism to monitor the actual current position of the aircraft, which provides situational awareness. The device is also capable of receiving positional information concerning other aircraft in the vicinity, which also provides enhanced situational awareness.

In exemplary embodiments of the systems and methods according to this invention, the cell phone 140 mode can be established using cellular telephone technology when not in flight. For example, the technology can be Global System for Mobile communications (GSM) or General Packet Radio Service (GPRS) technologies to allow users to access the Internet, send and receive e-mails and Short Message Services (SMS) messages. Moreover, the systems and methods of this invention also provide for receipt and display of facsimile information.

Figure 2:
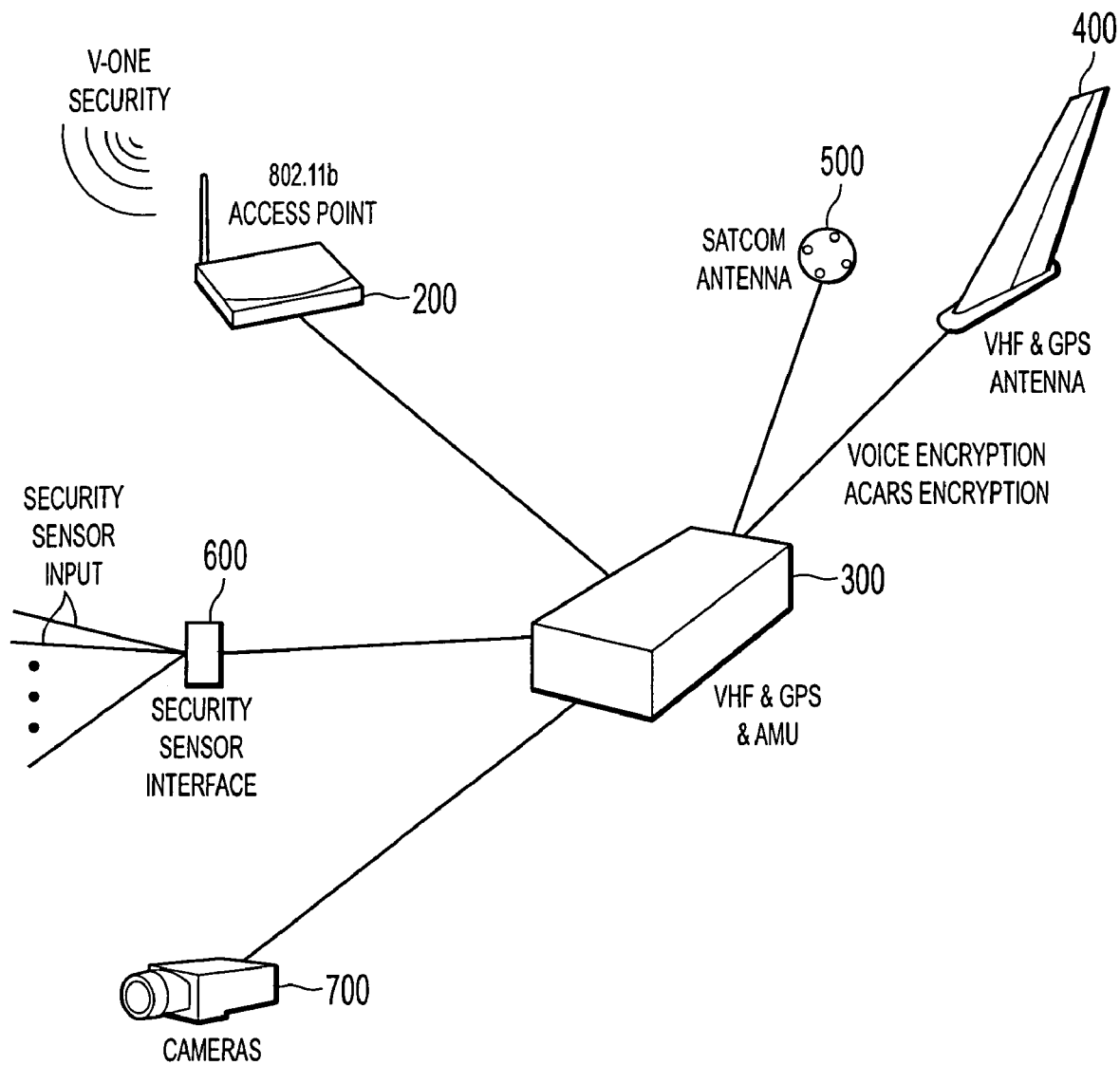
FIG. 2 illustrates a communication system of one exemplary embodiment according to this invention.

FIG. 2 illustrates a communication system 10 of one exemplary embodiment of the systems and methods according to this invention. As shown in FIG. 2, the communication system 10 includes a receiver for a wireless access device 200, ACARS transceiver system 300, VHF and GPS antenna 400, SATCOM antenna 500, security sensor interface 600 and at least one peripheral device 700.

The wireless access device 200 can transmit, for example, by a 802.11x access point. The data link may be encrypted, as an exemplary embodiment of the systems and methods according to this invention, by implementing a V-ONE security data link. Under certain conditions, the wireless access device 200 can transmit a vehicle position at a programmed interval for tracking, which can only be turned off by encrypted command from, for example, a ground operations center. Once a special or threat condition is initiated by the flight crew or by the FAMs, the onboard system will begin transmitting ACARS messages to appropriate ground based control centers at a programmed time interval (typically 30 seconds). Due to the covert nature of the installed system hardware, the position report transmissions cannot be stopped by any physical means when the aircraft is airborne or by any command entered into the system from airborne equipment. Only a message or command entered at a valid ground based control or operations center can terminate the automatic transmissions of position reports from an airborne system. This capability eliminates the possibility of airborne disarming of the system, intentionally or unintentionally.

The ACARS transceiver system 300 incorporates a VHF radio modem and a SATCOM modem that uses ACARS data. One exemplary embodiment in ACARS functionality includes airborne capabilities, such as, for example, but not limited to, capabilities to transmit weather requests (ATIS, TAF, METAR), graphic weather information, text messages, PDC requests, position reports (including, for example, autonomous tracking information), estimates, delays and special/emergency conditions, and to perform GPS Spoofing. Another exemplary embodiment in ACARS functionality includes automated messages capability. For example, but not limited to, implementing Out, Off, On, In (OOOI) and security intrusion messaging. Yet, another exemplary embodiment in ACARS functionality includes ground based capabilities, for example, but not limited to, implementing graphic display of aircraft position, web-based messaging and ARINC 24/7 monitoring and backup. The CDUs, such as, for example, pocket PC or PDA devices, have the ability and capacity to store and archive all data communicated. This includes data transmitted as well as data received. The operator has the ability to review archived data and select messages to retransmit or to be used as templates to generate new messages. The device databases are ultimately downloaded to ground based systems for archiving, analysis and reporting.

The ACARS transceiver system 300 can also switch to voice communication mode that enables communications to an existing AGD network, as described above.

The ACARS transceiver system 300 provides control to signal voice or data connectivity that converts the digital audio to analog for voice communication. The digital voice signal is generated by a CDU 100 (see FIG. 1) using VoiP technology and is transmitted as digital voice packets, to other CDUs as well as to the ACARS transceiver 300 which converts the digital voice packets to analog in order to transmit the voice over the ARINC AGD network. Conversely, analog voice received to the ACARS transceiver 300 is converted to digital VoiP, and relayed to the CDUs.

The VHF and GPS antenna 400 facilitates a direct air-ground and ground-air digital communications mode by means of a VHF sub-network. The SATCOM antenna 500 facilitates an indirect air-ground and ground-air digital communication mode by means of a sub-network of telecommunication satellites. The ACARS transceiver 300 implements, at the choice of the pilot of the aircraft, a choice between the VHF and GPS antenna 400 or the SATCOM antenna 500 depending on the telecommunications network Coverage to be employed. If the VHF antenna 400 does not operate at a specific coverage area, then the SATCOM antenna 500 will replace the VHF antenna 400 to provide coverage. Among the parameters influencing the pilot's choice of features includes cost, performance and security of the communications, as well as the availability of the transmission equipment on board the aircraft and on the ground in the coverage area. It should be appreciated that the ACARS digital telecommunications network is implemented throughout the world on behalf of the airlines by various operators who offer ground-to-ground, air-to-air, in aircraft, and ground-to-air coverage.

The security sensor interface 600 serves as a security server. The security sensor interface 600 has a security sensor input. The input sensors can interface with and monitor onboard devices, such as, for example, physical panic buttons that can be used by the flight crew to alert FAMs of threat conditions, and to other signal generating devices, such as fire or smoke detectors which would enable the system to send automatic ACARS messages to appropriate ground based systems should certain events occur. The system will also transmit to onboard CDUs in the event of any sensor detected input.

The ACARS transceiver 300 can be connected to at least one peripheral device 700, such as, for example, as an exemplary embodiment, at least one videocamera. The peripheral device(s) 700 can be placed anywhere in the aircraft including, for example, in the cockpit or the cabin, that is intended to be monitored by the video camera(s) and controlled by FAMs using CDUs. The CDUs interface with the peripheral device(s) 700 and the communications systems and methods according to this invention to operate the movements and functions of the peripheral device(s) 700. Further, FAMs can operate CDUs to display streaming video or select video frames that are captured by a video camera to be transmitted, for example, to the operations center. In other words, a peripheral device 700 may be used to transmit real time video feed to the CDU wirelessly, to permit FAMs to transmit streaming and/or still video image signals to the operations center.

It should be appreciated that in various exemplary embodiments, these elements, while shown in FIG. 2 as separate elements, are not necessarily separate and distinct components. Thus, the functions and/or operations of any one or more of these elements may be carried out by a single device, structure and/or subsystem.

Figure 3:
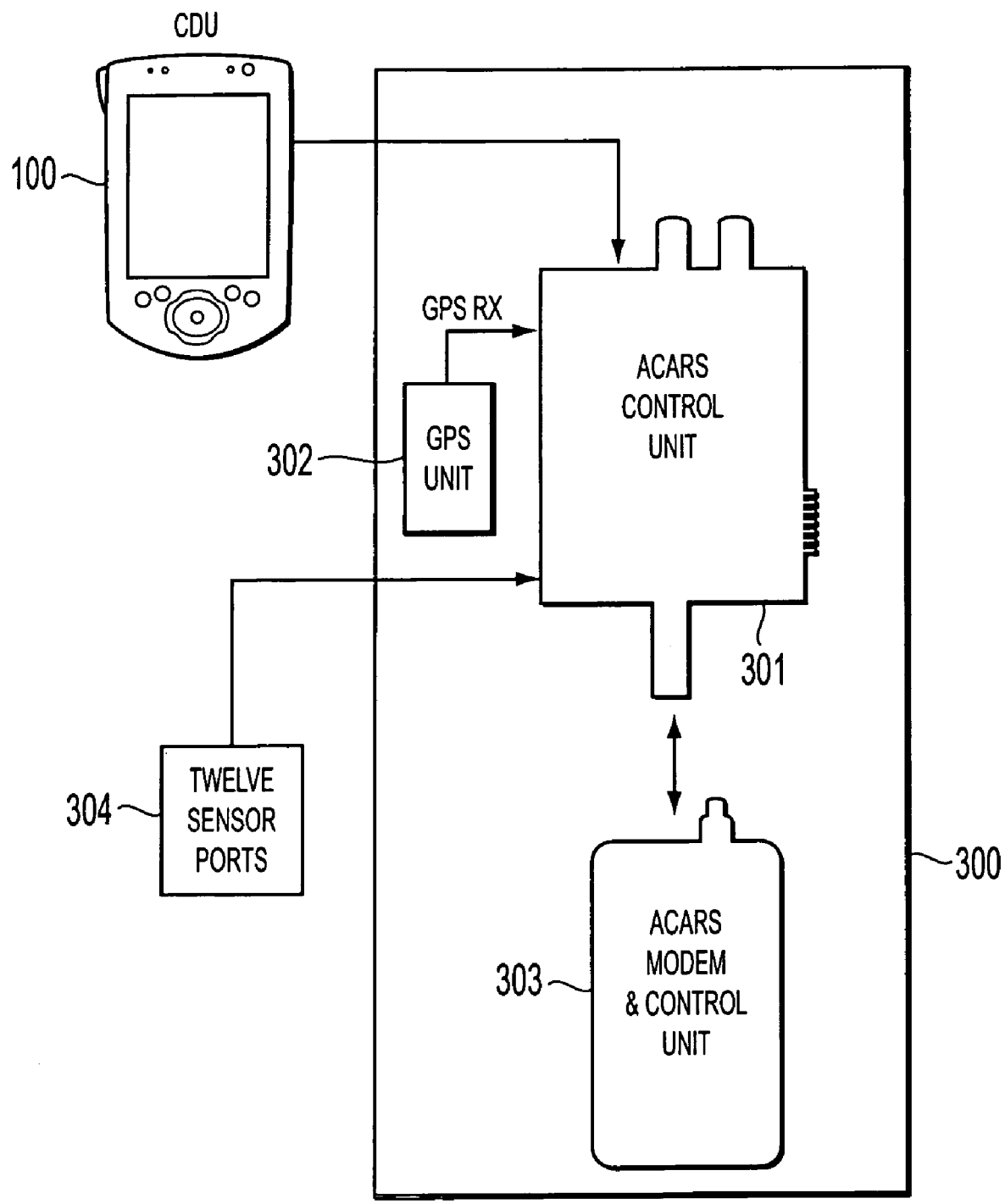
FIG. 3 illustrates in greater detail the components of a communication apparatus according to an exemplary embodiment of the invention.

FIG. 3 illustrates the detailed various components of the ACARS transceiver 300. The ACARS transceiver 300 includes a ACARS control unit (ACU) 301, GPS unit 302, modem and control unit (MCU) 303, and 12 sensor ports 304 that communicate with multiple CDUs 100 or to other appropriately-configured pocket PC or PDA devices.

The ACARS transceiver 300 is integrated into a single enclosure. The ACU 301 includes a processor and memory for program instructions and data storage on a single circuit board. The ACU 301 is the main processing unit of the ACARS transceiver unit. The ACU 301 controls all peripherals and provides the necessary encapsulation of data into the ACARS protocol and format. The ACU 301 also generates the special condition and event messages to transmit via the modem to the ground based systems or to CDU 100 onboard the aircraft. The ACU 301 also manages the communications connectivity by determining appropriate media to be used for communications (per coverage).

The MCU 303 provides ACU data to the VHF or SATCOM based transmitters in appropriate format and characteristics. The MCU 303 also receives data (ACARS messages) from VHF or SATCOM channels and provides the data to the ACU 301 for necessary processing and distribution.

The GPS unit 302 provides the ACU 301 real-time position and time information. This information is used by the ACU 301 to determine appropriate communication frequencies based on geographic coordinates and appropriate spatial coverage, provides position information used in ACARS position report messages, provides positional information used for situation display capability of individual CDUs 100 when positional information is superimposed over a map or chart, and provides time information for system management and message time stamping.

A VHF radio transceiver to which the MCU may be connected may be used as the primary communications media for data over the ACARS network as well as for Voice communications using the ARINC AGD voice network.

Through the 12 sensor ports 304, an integrated sensor input (monitoring) capability is available to be used, for example, but not limited to, monitor sensor units external to the ACARS transceiver 300 and to provide physical contacts to devices such as panic buttons, fire detection, and door contacts to provide a capability to automatically generate alerts and ACARS messages upon detection of changes of states of monitored sensor points. The ACARS messages are generated and displayed from regarding numerous conditions, such as, for example, that the aircraft has taken off based on a signal from the weight sensor on landing gear or that a treat condition exists based on a signal from a panic button pressed by flight crew. Sensor detection may also initiate other features such as automatic position reporting and tracking as determined by the ACU 301.

Figure 4:
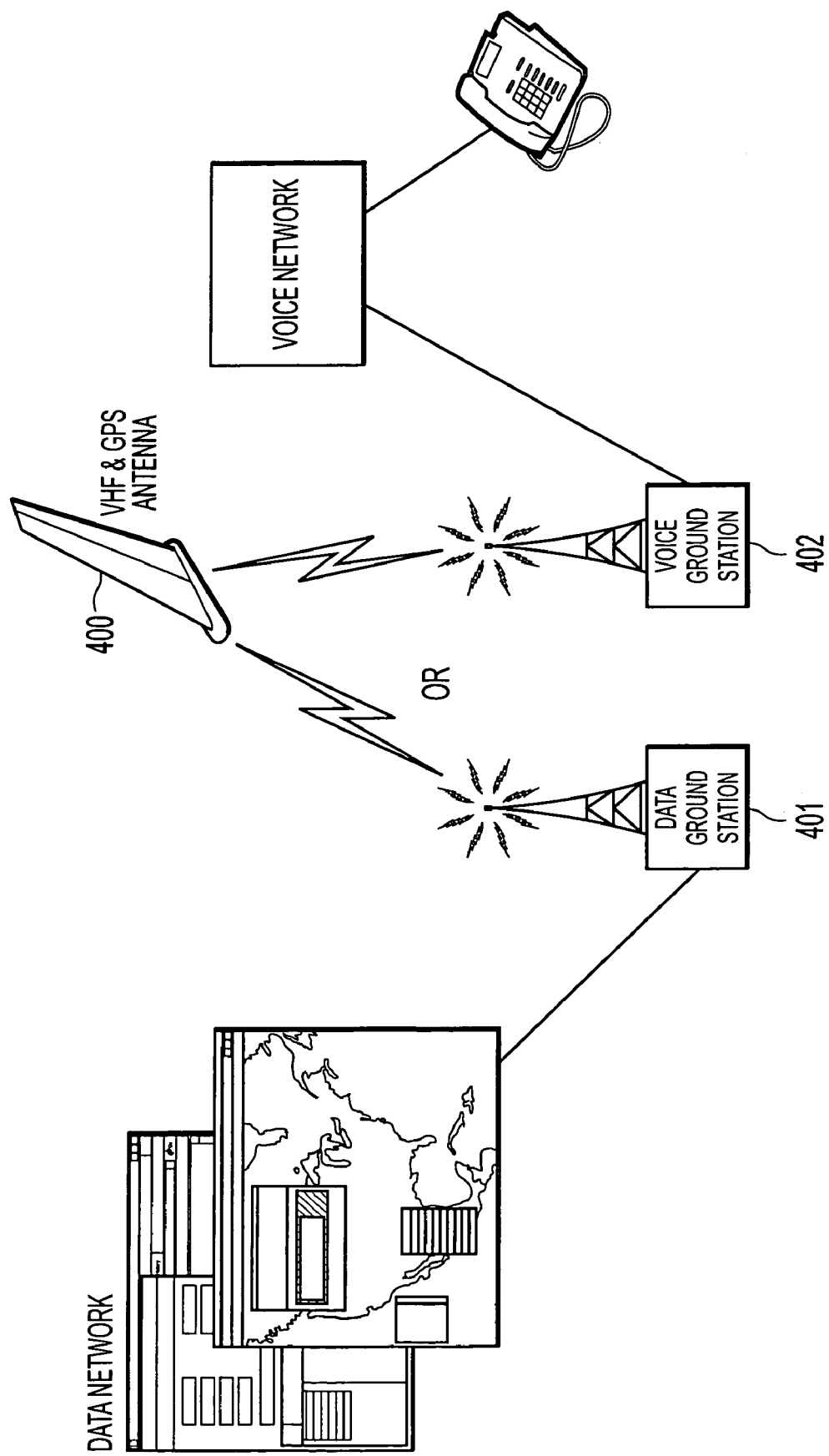
FIG. 4 illustrates communication networks for data and voice networks according to an exemplary embodiment of the invention.

FIG. 4 illustrates the communication networks for the data and voice transmission and reception according to an exemplary embodiment of the systems and methods of this invention. As shown in FIG. 4, the VHF and GPS antenna 400 connects to a data ground station 401 or to a voice ground station 402. Voice communications via the ground from an aircraft may be established, for example, by phone or by iDEN, and may be established between FAMs and flight crew members or other individual on the aircraft on which FAMs are located, or between FAMs and flight crew members or other FAMs or other selected individuals on another aircraft.

Figure 5:
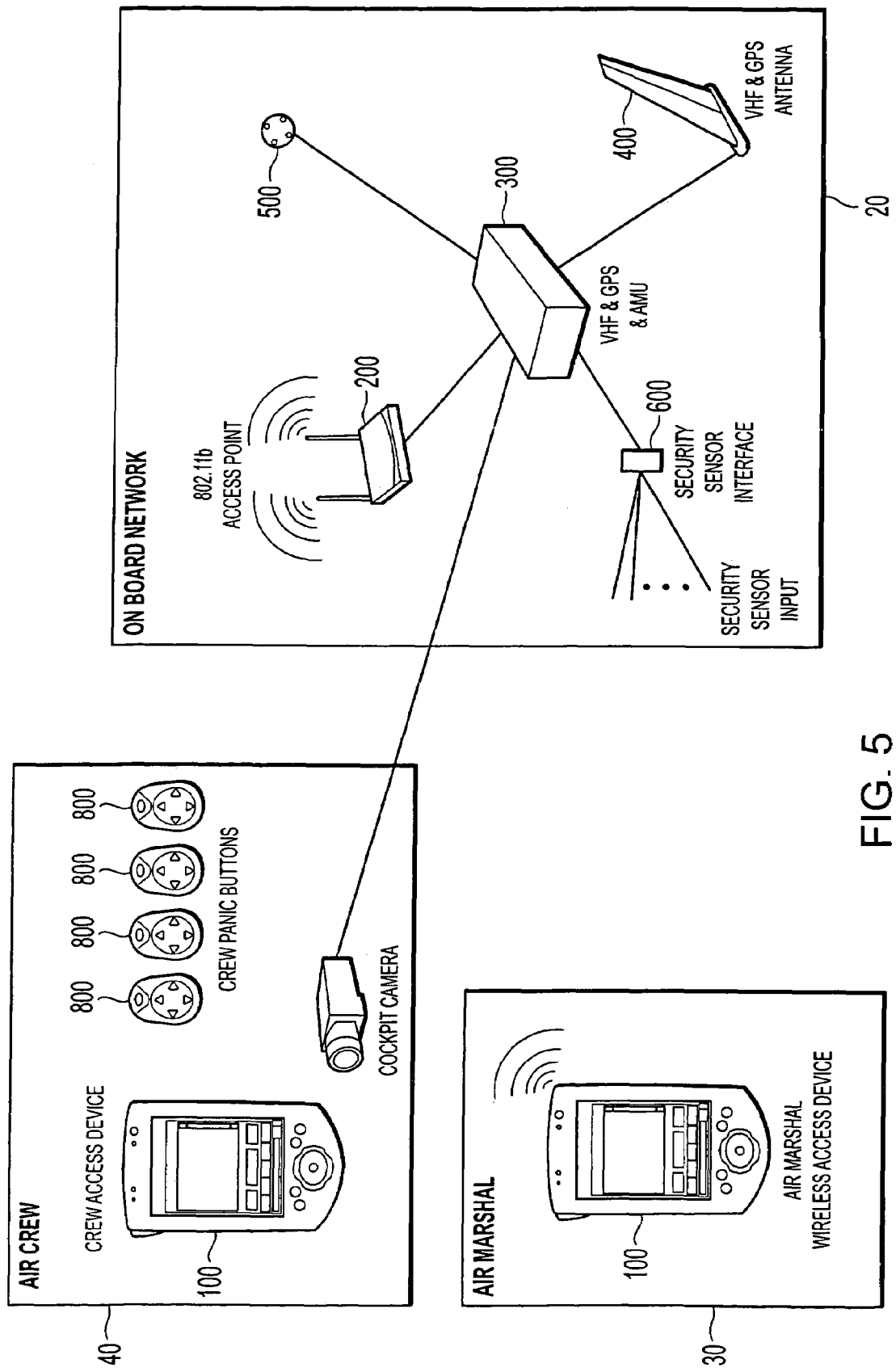
FIG. 5 illustrates communication system components according to an exemplary embodiment of the invention.

FIG. 5 illustrates communication system components according to an exemplary embodiment of the invention. The communication system is divided into three general areas. Area 20 represents the onboard network, area 30 represents the at least one of the FAMs (Air Marshal) and area 40 represents the flight or air crew.

Area 20, as previously shown in FIG. 2, is the communication system, specifically the onboard network having a wireless access device 200, ACARS transceiver system 300, VHF and GPS antenna 400, SATCOM antenna 500, security sensor interface 600 and at least one peripheral device 700.

Area 30 represents at least one of the FAMs who communicates with the onboard network while in flight by the wireless access CDU 100.

Area 40 represents the flight or air crew members who communicate with the onboard network by the CDU 100.

Further, FIG. 5 shows the ACARS transceiver system 300 connected with at least one peripheral device 700 that is connected in area 40. The peripheral device 700 may be monitored and controlled by anyone who possesses the CDU 100.

As shown in FIG. 5, a plurality of remote panic button devices 800 are displayed. Each remote panic button device 800 is a portable device typically carried at all times by the pilot and other flight crew members. The remote panic button device 800 transmits a signal to the communication system to alert the system that there is a threat situation onboard the aircraft. That is, a member of the flight crew may activate a remote panic button 800 in the cockpit to transmit a signal that there is a threat situation to an operations center and/or FAMs on board the aircraft or other aircraft. The systems and methods according to this invention provide for the transmission of an Emergency Broadcast Message to the operations center and/or the FAMs on board this or other aircraft.

Figure 6:
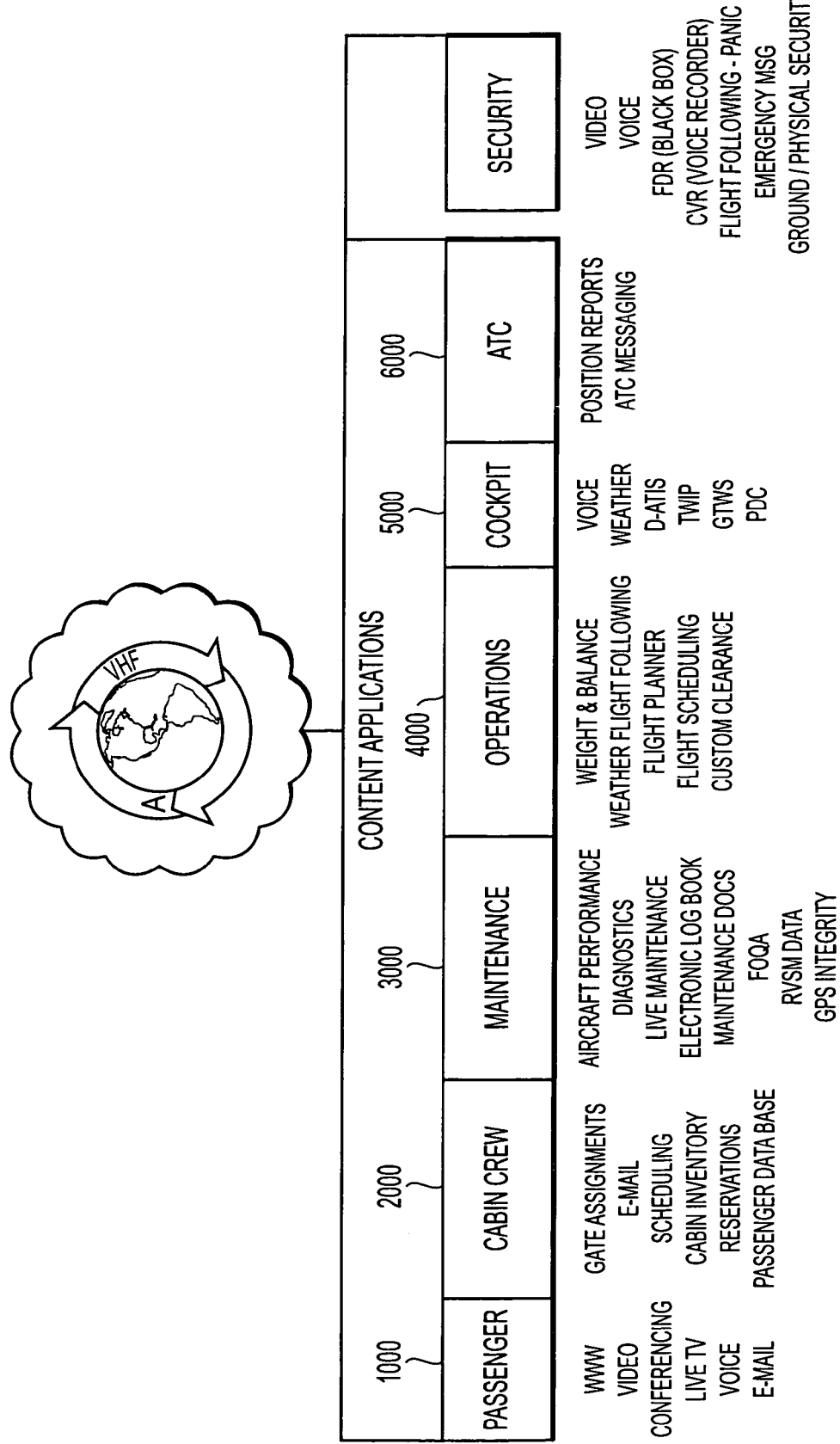
FIG. 6 illustrates various content applications for the system according to an exemplary embodiment of the invention.

FIG. 6 illustrates various exemplary content applications for the system according to an exemplary embodiment of the invention. For example, an aircraft passenger 1000 may use the systems and methods according to this invention for secure videoconferencing via the world wide web, for viewing live television broadcasts, and for communicating with others using voice, e-mail, and facsimile communications.

An aircraft cabin crew 2000 may use the secure communications systems and methods according to this invention to communicate information regarding, for example, gate assignments, e-mail, facsimile, aircraft scheduling, cabin and/or cargo inventory, reservations, and a passenger database.

An aircraft maintenance crew 3000 may use the secure communications systems and methods of this invention regarding communications with respect to aircraft performance, system diagnostics, ongoing maintenance, maintaining an electronic logbook, maintenance documents, Flight Operations Quality Assurance (FOQA) data, Reduced Vertical Separation Monitoring (RVSM) data, and GPS information and system integrity data. The FOQA data is used by airline operations to verify and analyze the operational performance of a flight crew. FOQA data includes information regarding all aspects of a flight's performance including all system parameters and actions and control inputs made by the flight crew. The RVSM data is used to monitor the performance of aircraft navigation and position accuracy of the onboard equipment. The GPS information and system integrity data can be monitored and the system can automatically advise appropriate governmental authorities concerning the availability of GPS satellite information as well as operational performance of the GPS constellation itself.

Aircraft operations personnel 4000 may use the systems and methods according to this invention, for example, concerning aircraft weight and balance, flight weather condition information, flight planning, flight scheduling and customs clearance.

Aircraft cockpit crew members 5000 may use the systems and methods according to this invention, for example, concerning voice, weather (Digital Automated Terminal Information Services (D-ATIS), Terminal Weather Information Processor (TWIP), Graphics and Text Weather Services (GTWS)), and Pre Departure Clearance (PDC) communications.

Aircraft air traffic control personnel 6000 may use the systems and methods according to this information, for example, regarding position report communications and Air Traffic Control messages.

FAMs and other authorized individuals concerned with security or otherwise may use the systems and methods according to this invention for many communications matters, including for example, video communications, voice communications, Flight Data Recorder (Black Box) information and data, CVR (Cockpit Voice Recorder) information and data, flight following by military aircraft based on a panic communication, Emergency Broadcast Messages and ground security and aircraft physical security information.

Flight crew members can use this system in its simplest form to only monitor the sensor input devices for automated event notification such as a treat or panic condition or weight off wheels.

Flight crew members can arm the system and enable automatic ACARS messages to specified entities on event of sensor detection of unauthorized door opening should the sensors be enabled when an aircraft is parked and unattended.

While this invention has been described in conjunction with the exemplary embodiments outlined above, it is evident that many alternatives, modifications and variations will be apparent to those skilled in the art. Furthermore, although the exemplary embodiments are described for use in a variety of aircraft, it is contemplated that this invention may be used with other methods of transportations through the land and the sea. Accordingly, the exemplary embodiments of the invention, as set forth above, are intended to be illustrative, not limiting. Various changes may be made to the invention without departing from the spirit and scope thereof.

The invention claimed is:

1. A communication system for communicating messages between an aircraft and a remote operations center, comprising:
   at least one portable control and display unit onboard an aircraft that transmits and receives (1) data communication, (2) voice communication, and (3) video communication;
   an Aircraft Communication and Reporting System (ACARS) transceiver located on the aircraft to receive from and transmit to the at least one portable control and display unit (1) data communication, (2) voice communication, and (3) video communication; and
   at least one peripheral device located on the aircraft,
   wherein a user employs the at least one portable control and display unit to transmit messages to and receive messages from a remote operations center via the ACARS transceiver communicating through a VHF radio onboard the aircraft, the messages comprising the at least one of data communication, voice communication and video communication,
   wherein the at least one portable control and display unit is configured to transmit a vehicle position at a programmed interval which can only be turned off by encrypted command from a remote site.

2. A method for communicating messages between an aircraft and a remote operations center, comprising:
   employing a portable control and display unit onboard an aircraft to send and receive messages that include (1) data communication, (2) voice communication, and (3) video communication to an ACARS transceiver onboard the aircraft,
   wherein the portable control and display unit sends and receives positional information concerning the location of the aircraft while airborne,
   wherein the at least one portable control and display unit transmits a vehicle position at a programmed interval which can only be turned off by encrypted command from a remote site;
   automatically retransmitting messages received from the portable control and display unit via the ACARS transceiver to a remote operations center; and
   automatically retransmitting messages received from a remote operations center via the ACARS transceiver to the portable control and display unit.

* * * * *